United States Patent
Yan et al.

(10) Patent No.: US 10,015,814 B2
(45) Date of Patent: Jul. 3, 2018

(54) UPLINK TRANSMISSION METHOD, BASE STATION AND USER EQUIPMENT

(71) Applicant: Huawei Technologies Co., Ltd., Shenzhen (CN)

(72) Inventors: Zhiyu Yan, Shenzhen (CN); Li Chai, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 129 days.

(21) Appl. No.: 14/812,554

(22) Filed: Jul. 29, 2015

(65) Prior Publication Data
US 2015/0334739 A1    Nov. 19, 2015

Related U.S. Application Data

(63) Continuation of application No. PCT/CN2013/071127, filed on Jan. 30, 2013.

(51) Int. Cl.
*H04W 72/12* (2009.01)
*H04W 72/04* (2009.01)
(Continued)

(52) U.S. Cl.
CPC .... *H04W 72/1284* (2013.01); *H04W 28/0231* (2013.01); *H04W 28/0278* (2013.01); *H04W 72/0426* (2013.01); *H04W 92/20* (2013.01)

(58) Field of Classification Search
CPC ......... H04W 72/0426; H04W 72/1284; H04W 28/0231; H04W 28/0278; H04W 92/20;
(Continued)

(56) References Cited

U.S. PATENT DOCUMENTS

| 2009/0175229 A1 | 7/2009 | Tseng |
| 2011/0026467 A1 | 2/2011 | Wen et al. |

(Continued)

FOREIGN PATENT DOCUMENTS

| CN | 101132220 A | 2/2008 |
| CN | 101478777 A | 7/2009 |

(Continued)

OTHER PUBLICATIONS

3rd Generation Partnership Project; Technical Specification Group Radio Access Network; Evolved Universal Terrestrial Radio Access (E-UTRA); Medium Access Control (MAC) Protocol Specification (Release 10), 3GPP TS 36.321, V10.7.0, Dec. 2012, 54 pages.
(Continued)

*Primary Examiner* — Paul H Masur
*Assistant Examiner* — Michael Phillips
(74) *Attorney, Agent, or Firm* — Brinks Gilson & Lione

(57) ABSTRACT

Embodiments of the present invention provide an uplink transmission method, a base station and a user equipment. The method includes: receiving uplink split information sent by a first base station, wherein the uplink split information is used for instructing a second base station to receive data in buffers corresponding to N1 logic channel groups of a user equipment, the N1 logic channel groups are determined by the first base station from a BSR sent by the UE, and N1 is a positive integer larger than 0; determining N2 logic channel groups from the N1 logic channel groups, wherein N2 is a non-negative integer smaller than or equal to N1; and sending feedback information to the first base station, wherein the feedback information is used for indicating the determined result. In an embodiment of the present invention, a flexibility of the uplink transmission is improved.

18 Claims, 9 Drawing Sheets

(51) Int. Cl.
*H04W 92/20* (2009.01)
*H04W 28/02* (2009.01)

(58) Field of Classification Search
CPC ........... H04W 72/0413; H04W 76/025; H04W 24/10; H04W 72/1252; H04W 24/02; H04W 28/08; H04W 8/14; H04W 72/0406; H04W 16/08; H04W 16/32; H04W 92/04; H04W 88/06; H04W 88/08; H04W 72/0486; H04W 28/18; H04L 5/0091
See application file for complete search history.

(56) References Cited

U.S. PATENT DOCUMENTS

| | | | |
|---|---|---|---|
| 2011/0170495 A1* | 7/2011 | Earnshaw | H04W 72/02 370/329 |
| 2012/0044814 A1 | 2/2012 | Natarajan et al. | |
| 2014/0056243 A1* | 2/2014 | Pelletier | H04W 74/04 370/329 |
| 2014/0126399 A1* | 5/2014 | Damnjanovic | H04W 72/1252 370/252 |
| 2016/0050652 A1* | 2/2016 | Wu | H04L 5/001 370/329 |

FOREIGN PATENT DOCUMENTS

| | | |
|---|---|---|
| CN | 101827391 A | 9/2010 |
| CN | 101867871 A | 10/2010 |
| CN | 101541099 B | 12/2011 |
| EP | 2 343 946 A2 | 7/2011 |
| WO | WO 2010/135720 A1 | 11/2010 |
| WO | WO 2011/100492 A1 | 8/2011 |

OTHER PUBLICATIONS

Tripathi, Suyash et al., "LTE E-UTRAN and Its Access Side Protocols," Radisys White Paper, Sep. 2011, pp. 1-17.

* cited by examiner

UPLINK TRANSMISSION METHOD, BASE STATION AND USER EQUIPMENT

CROSS-REFERENCE TO RELATED APPLICATIONS

This application is a continuation of International Application No. PCT/CN2013/071127, filed on Jan. 30, 2013, which is hereby incorporated by reference in its entirety.

TECHNICAL FIELD

Embodiments of the present invention relate to a field of wireless communications, and more particularly, relate to an uplink transmission method, a base station and a user equipment.

BACKGROUND

In a long term evolution-advanced (LTE-A) system, a shared channel is used for transmitting data. After a user equipment (UE) establishes a radio bearer (RB) with an evolved base station (eNB), there is no fixed data uplink resource. When there exists uplink data to be transmitted, the UE requests an uplink resource from the eNB. After the eNB allocates an uplink resource, the UE sends the uplink data by using the uplink resource.

The UE may request an uplink resource from the eNB by adopting a buffer status report (BSR). The BSR is a more detailed notification manner, which may not only notify the eNB that the UE has data to be uploaded, but also notify the eNB of a size of the data to be transmitted.

Multiple logical channels of a UE may work simultaneously, and priority levels of these logical channels are different. In order to allow an eNB to know which logical channels have data to be transmitted and control a size of a BSR, the third generation partnership project (3GPP) groups the logical channels according to the priority levels, the group of the logical channels is configured by an upper layer signaling, and each logical channel group has a cache or buffer. When a BSR is reported, a data status of each buffer is reported to notify an eNB of a size of data to be transmitted in each logical channel group.

In an LTE-A system, in order to satisfy a requirement of the International Telecommunication Union on the peak data rate of the fourth generation communication technology, a carrier aggregation (CA) technology, also known as a spectrum aggregation or bandwidth extension technology, is introduced. In the carrier aggregation technology, frequency spectrums of two or more component carriers are aggregated together to obtain a wider transmission bandwidth. The carrier aggregation comprises a carrier aggregation in a base station and a carrier aggregation between base stations.

In a carrier aggregation in a base station, or in a carrier aggregation under a macro cell and a micro cell, between which there exists an ideal backhaul, for example, the macro cell and the micro cell are connected through an optical fiber (the micro cell may also be a cell within a coverage of a radio frequency head herein), a joint scheduling may be adopted among multiple carriers, namely, when scheduling a carrier in aggregated carriers, the eNB also knows a scheduling condition on another carrier. When allocating the uplink resource to a UE after receiving a BSR of the UE, the eNB may comprehensively consider a load and scheduling condition of each carrier to reasonably allocate a scheduling resource to the UE.

In the carrier aggregation between base stations or a carrier aggregation under a non-ideal backhaul condition, a real-time data transmission between the base stations could not be achieved. A typical application scenario is as follows. The macro cell mainly provides system information, a radio link monitoring and a mobility management in order to ensure a continuity of a service. Meanwhile, in order to ensure a continuity of a voice service, a semi-persistent scheduling service is also served by the macro cell generally. Multiple micro cells deployed within a coverage of the macro cell mainly provide a transmission of a high data rate service. In this case, the macro cell is a primary cell of a UE, and a corresponding macro base station is called a primary base station. The micro cell is a secondary cell of the UE, and a corresponding micro base station is called a secondary base station.

After receiving a BSR of the UE, the macro base station performs a classification based on service types corresponding to logical channel groups. For example, data corresponding to the semi-persistent scheduling service is kept and served by the macro cell, and the high data rate service is shunted to the micro cell. In the prior art, the macro base station and the micro base station passively and directly perform uplink split according to the service type of the uplink data, so that the flexibility is poor.

SUMMARY

Embodiments of the present invention provide an uplink transmission method, a base station and a user equipment, which improve the flexibility of uplink transmission.

In a first aspect, an uplink transmission method is provided, including: receiving uplink split information sent by a first base station, wherein the uplink split information is used for instructing a second base station to receive data in buffers corresponding to $N_1$ logic channel groups of a UE, wherein the $N_1$ logic channel groups are determined by the first base station from a BSR sent by the UE, and $N_1$ is a positive integer larger than 0; determining $N_2$ logic channel groups from the $N_1$ logic channel groups, wherein $N_2$ is a non-negative integer smaller than or equal to $N_1$; and sending feedback information to the first base station, wherein the feedback information is used for indicating the determined result.

In combination with the first aspect, in an implementation manner of the first aspect, the determining $N_2$ logic channel groups from the $N_1$ logic channel groups includes: determining the $N_2$ logic channel groups from the $N_1$ logic channel groups according to at least one of followings: the uplink split information, a load condition of the second base station and a channel quality between the second base station and the UE.

In combination with the first aspect and the above-mentioned implementation manner, in another implementation manner of the first aspect, the method further includes: sending first indication information to the UE, wherein the first indication information is used for indicating the second base station will receive the data in the buffers corresponding to the $N_2$ logic channel groups.

In combination with the first aspect and the above-mentioned implementation manner, in another implementation manner of the first aspect, before the sending first indication information to the UE, the method further includes: receiving second indication information sent by the first base station, wherein the second indication information includes identifiers of $N_3$ logic channel groups of the UE, which are about to transmit data, $N_3$ is a positive integer larger than or equal to $N_1$, and the first indication information is further used for indicating the first base station will receive data in buffers corresponding to rest logic channel groups, wherein the rest logic channel groups are rest logic channel groups when the $N_2$ logic channel groups are excluded from the $N_3$ logic channel groups.

In combination with the first aspect and the above-mentioned implementation manner, in another implementation manner of the first aspect, the determined result is used for indicating the second base station will receive data in buffers corresponding to the $N_2$ logic channel groups, and the method further includes: sending uplink scheduling information to the UE, wherein the uplink scheduling information is used for instructing the UE to send the data in the buffers corresponding to the $N_2$ logic channel groups to the second base station.

In combination with the first aspect and the above-mentioned implementation manner, in another implementation manner of the first aspect, $N_2$ equals to 0, and the determined result is used for indicating the second base station will not to receive the data in the buffers corresponding to the $N_1$ logic channel groups.

In combination with the first aspect and the above-mentioned implementation manner, in another implementation manner of the first aspect, the uplink split information includes an identifier of the UE and a data status of the data in the buffers corresponding to the $N_1$ logic channel groups.

In the second aspect, an uplink transmission method is provided, including: receiving a BSR sent by a UE, wherein the BSR is used for instructing a first base station to receive data in buffers corresponding to $N_3$ logic channel groups of the UE, which are about to transmit data, and $N_3$ is a positive integer larger than 0; determining $N_1$ logic channel groups from the $N_3$ logic channel groups; and sending uplink split information to the second base station, wherein the uplink split information is used for instructing the second base station to receive data in buffers corresponding to the $N_1$ logic channel groups, so as to enable the second base station to determine $N_2$ logic channel groups from the $N_1$ logic channel groups, and $N_2$ is a non-negative integer smaller than or equal to $N_1$;
receiving feedback information sent by the second base station, wherein the feedback information is used for indicating a result determined by the second base station.

In combination with the second aspect, in an implementation manner of the second aspect, the determining $N_1$ logic channel groups from the $N_3$ logic channel groups includes: determining the $N_1$ logic channel groups from the $N_3$ logic channel groups according to at least one of followings: a load condition of the first base station, a load condition of the second base station and a service type of each logic channel group in the $N_3$ logic channel groups.

In combination with the second aspect and the above-mentioned implementation manner, in another implementation manner of the second aspect, the method further includes: sending indication information to the UE, wherein the indication information is used for indicating the second base station will receive data in buffers corresponding to the $N_2$ logic channel groups.

In combination with the second aspect and the above-mentioned implementation manner, in another implementation manner of the second aspect, the indication information is further used for indicating the first base station will receive data in buffers corresponding to rest logic channel groups, wherein the rest logic channel groups are rest logic channel groups when the $N_2$ logic channel groups are excluded from the $N_3$ logic channel groups.

In combination with the second aspect and the above-mentioned implementation manner, in another implementation manner of the second aspect, the method further includes: sending uplink scheduling information to the UE, wherein the uplink scheduling information is used for instructing the UE to send data in buffers corresponding to rest logic channel groups to the first base station, and the rest logic channel groups are rest logic channel groups when the $N_2$ logic channel groups are excluded from the $N_3$ logic channel groups.

In combination with the second aspect and the above-mentioned implementation manner, in another implementation manner of the second aspect, the method further includes: sending uplink scheduling information to the UE, wherein the uplink scheduling information is used for instructing the UE to send data in buffers corresponding to rest logic channel groups to the first base station, and the rest logic channel groups are rest logic channel groups when the N2 logic channel groups are excluded from the N3 logic channel groups.

In combination with the second aspect and the above-mentioned implementation manner, in another implementation manner of the second aspect, the result determined by the second base station is used for indicating the second base station will receive data in buffers corresponding to the $N_2$ logic channel groups.

In combination with the second aspect and the above-mentioned implementation manner, in another implementation manner of the second aspect, the $N_2$ is equal to 0, and the result determined by the second base station is used for indicating the second base station will not receive the data in the buffers corresponding to the $N_1$ logic channel groups.

In combination with the second aspect and the above-mentioned implementation manner, in another implementation manner of the second aspect, the uplink split information includes an identifier of the UE and a data status of the data in the buffers corresponding to the $N_1$ logic channel groups.

In the third aspect, an uplink transmission method is provided, including: sending a BSR to a first base station, wherein the BSR is used for instructing the first base station to receive data in buffers corresponding to $N_3$ logic channel groups of the UE, which are about to transmit data, and $N_3$ is a positive integer larger than 0; and receiving first indication information sent by the first base station or a second base station, wherein the first indication information is used for indicating the second base station will receive data in buffers corresponding to $N_2$ logic channel groups in the $N_3$ logic channel groups, and $N_2$ is a non-negative integer smaller than or equal to $N_3$.

In combination with the third aspect, in an implementation manner of the third aspect, the method in the second aspect further includes: receiving second indication information sent by the first base station or the second base station, wherein the second indication information is used for indicating the UE that the first base station will receive data in buffers corresponding to rest logic channel groups, and the rest logic channel groups are rest logic channel groups when the $N_2$ logic channel groups are excluded from the $N_3$ logic channel groups.

In combination with the third aspect and the above-mentioned implementation manner, in another implementation manner of the third aspect, the method further includes: receiving uplink scheduling information sent by the first base station, wherein the uplink scheduling information sent by the first base station is used for instructing the UE to send data in buffers corresponding to rest logic channel groups to the first base station, and the rest logic channel groups are rest logic channel groups when the $N_2$ logic channel groups are excluded from the $N_3$ logic channel groups; and receiving uplink scheduling information sent by the second base station, wherein the uplink scheduling information sent by the second base station is used for instructing the UE to send the data in the buffers corresponding to the $N_2$ logic channel groups to the second base station.

In the fourth aspect, a base station is provided, including: a receiving unit, configured to receive uplink split information sent by a first base station, wherein the uplink split information is used for instructing the base station to receive data in buffers corresponding to $N_1$ logic channel groups of a UE, the $N_1$ logic channel groups are determined by the first base station from a BSR sent by the UE, and $N_1$ is a positive integer larger than 0; a determining unit, configured to determine $N_2$ logic channel groups from the $N_1$ logic channel groups, wherein $N_2$ is a non-negative integer smaller than or equal to $N_1$; and a sending unit, configured to send feedback information to the first base station, wherein the feedback information is used for indicating the determined result.

In combination with the fourth aspect, in an implementation manner of the fourth aspect, the determining unit is specifically configured to determine the $N_2$ logic channel groups from the $N_1$ logic channel groups according to at least one of followings: the uplink split information, a load condition of the second base station and a channel quality between the second base station and the UE.

In combination with the fourth aspect and the above-mentioned implementation manner, in another implementation manner of the fourth aspect, the sending unit is further configured to send first indication information to the UE, wherein the first indication information is used for indicating the second base station will receive the data in the buffers corresponding to the $N_2$ logic channel groups.

In combination with the fourth aspect and the above-mentioned implementation manner, in another implementation manner of the fourth aspect, the receiving unit is further configured to receive second indication information sent by the first base station, wherein the second indication information includes identifiers of $N_3$ logic channel groups of the UE, which are about to transmit data, and $N_3$ is a positive integer larger than or equal to $N_1$, and the first indication information is further used for indicating the first base station will receive data in buffers corresponding to rest logic channel groups, wherein the rest logic channel groups are rest logic channel groups when the $N_2$ logic channel groups are excluded from the $N_3$ logic channel groups.

In combination with the fourth aspect and the above-mentioned implementation manner, in another implementation manner of the fourth aspect, the determined result is used for indicating the second base station will receive the data in the buffers corresponding to the $N_2$ logic channel groups, and the sending unit is further configured to send uplink scheduling information to the UE, wherein the uplink scheduling information is used for instructing the UE to send the data in the buffers corresponding to the $N_2$ logic channel groups to the second base station.

In combination with the fourth aspect and the above-mentioned implementation manner, in another implementation manner of the fourth aspect, the uplink split information includes an identifier of the UE and a data status of the data in the buffers corresponding to the $N_1$ logic channel groups.

In combination with the fourth aspect and the above-mentioned implementation manner, in another implementation manner of the fourth aspect, the $N_2$ equals to 0, and the determined result is used for indicating the second base station will not receive the data in the buffers corresponding to the $N_1$ logic channel groups.

In the fifth aspect, a base station is provided, including: a receiving unit, configured to receive a BSR sent by UE, wherein the BSR is used for instructing the base station to receive data in buffers corresponding to $N_3$ logic channel groups of the UE, which are about to transmit data, and $N_3$ is a positive integer larger than 0; a determining unit, configured to determine $N_1$ logic channel groups from the $N_3$ logic channel groups; and a sending unit, configured to send uplink split information to the second base station, wherein the uplink split information is used for instructing the second base station to receive data in buffers corresponding to the $N_1$ logic channel groups, wherein the receiving unit is further configured to receive feedback information sent by the second base station, and the feedback information is used for indicating the second base station will receive the data in the buffers corresponding to $N_2$ logic channel groups of the UE, the $N_2$ logic channel groups are determined by the second base station from the $N_1$ logic channel groups, and $N_2$ is a non-negative integer smaller than or equal to $N_1$.

In combination with the fifth aspect, in an implementation manner of the fifth aspect, the determining unit is specifically configured to determine the $N_1$ logic channel groups from the $N_3$ logic channel groups according to at least one of followings: a load condition of the first base station, a load condition of the second base station and a service type of each logic channel group in the $N_3$ logic channel groups.

In combination with the fifth aspect and the above-mentioned implementation manner, in another implementation manner of the fifth aspect, the sending unit is further configured to send indication information to the UE, wherein the indication information is used for indicating the second base station will receive data in buffers corresponding to the $N_2$ logic channel groups.

In combination with the fifth aspect and the above-mentioned implementation manner, in another implementation manner of the fifth aspect, the indication information is further used for indicating the first base station will receive data in buffers corresponding to rest logic channel groups, wherein the rest logic channel groups are rest logic channel groups when the $N_2$ logic channel groups are excluded from the $N_3$ logic channel groups.

In combination with the fifth aspect and the above-mentioned implementation manner, in another implementation manner of the fifth aspect, the sending unit is further configured to send uplink scheduling information to the UE, wherein the uplink scheduling information is used for instructing the UE to send data in buffers corresponding to rest logic channel groups to the first base station, and the rest logic channel groups are rest logic channel groups when the $N_2$ logic channel groups are excluded from the $N_3$ logic channel groups.

In combination with the fifth aspect and the above-mentioned implementation manner, in another implementation manner of the fifth aspect, the uplink split information includes an identifier of the UE and a data status of the data in the buffers corresponding to the $N_1$ logic channel groups.

In combination with the fifth aspect and the above-mentioned implementation manner, in another implementation manner of the fifth aspect, the result determined by the second base station is used for indicating the second base station will receive data in buffers corresponding to the $N_2$ logic channel groups.

In combination with the fifth aspect and the above-mentioned implementation manner, in another implementation manner of the fifth aspect, $N_2$ is equals to 0, and the determined result is used for indicating the second base station will not receive the data in the buffers corresponding to the $N_1$ logic channel groups.

In the sixth aspect, a UE is provided, including: a sending unit, configured to send a BSR to a first base station, wherein the BSR is used for instructing the first base station to receive data in buffers corresponding to $N_3$ logic channel groups of the UE, which are about to transmit data, and $N_3$ is a positive integer larger than 0; and a receiving unit, configured to receive first indication information sent by the first base station or a second base station, wherein the first indication information is used for indicating the second base station will receive data in buffers corresponding to $N_2$ logic channel groups in the $N_3$ logic channel groups, and $N_2$ is a non-negative integer smaller than or equal to $N_3$.

In combination with the sixth aspect, in an implementation manner of the sixth aspect, the receiving unit is further configured to receive second indication information sent by the first base station or the second base station, wherein the second indication information is used for indicating the UE that the first base station will receive data in buffers corresponding to rest logic channel groups, and the rest logic channel groups are rest logic channel groups when the $N_2$ logic channel groups are excluded from the $N_3$ logic channel groups.

In combination with the sixth aspect and the above-mentioned implementation manner, in another implementation manner of the sixth aspect, the receiving unit is further configured to receive uplink scheduling information sent by the first base station, wherein the uplink scheduling information sent by the first base station is used for instructing the UE to send data in buffers corresponding to rest logic channel groups to the first base station, and the rest logic channel groups are rest logic channel groups when the $N_2$ logic channel groups are excluded from the $N_3$ logic channel groups; and to receive uplink scheduling information sent by the second base station, wherein the uplink scheduling information sent by the second base station is used for instructing the UE to send the data in the buffers corresponding to the $N_2$ logic channel groups to the second base station.

In an embodiment of the present invention, during an uplink transmission, the macro base station and the micro base station, through coordinating, determine a split manner of uplink data, thus improving a flexibility of the uplink transmission.

BRIEF DESCRIPTION OF DRAWINGS

To illustrate technical solutions in the embodiments of the present invention more clearly, a brief introduction on the accompanying drawings which are needed in the description of the embodiments of the present invention is given below. Apparently, the accompanying drawings in the description below are merely some of the embodiments of the present invention, based on which other drawings may be obtained by those of ordinary skill in the art without any creative effort.

DESCRIPTION OF EMBODIMENTS

A clear description of technical solutions in embodiments of the present invention will be given below, in combination with accompanying drawings in the embodiments of the present invention. Apparently, the embodiments described below are merely a part, but not all, of the embodiments of the present invention. All of other embodiments, obtained by those of ordinary skill in the art based on the embodiments of the present invention without any creative effort, should fall into the protection scope of the present invention.

It should be understood that, a technical solution of the present invention may be applied to various communication systems, such as a global system of mobile communication (GSM), a code division multiple access (CDMA) system, a wideband code division multiple access (WCDMA) system, a general packet radio service (GPRS), a long term evolution (LTE) system, an advanced long term evolution (LTE-A) system, a universal mobile telecommunication system (UMTS), and the like.

It should also be understood that, in an embodiment of the present invention, a user equipment (UE) includes, but not limited to, a mobile station (MS), a mobile terminal, a mobile telephone, a handset and portable equipment and the like. and the user equipment may communicate with one or multiple core networks through a radio access network (RAN). For example, the user equipment may be a mobile telephone (or called a "cellular" telephone), a computer with a wireless communication function or the like, and the user equipment may also be a portable, pocket, hand-held, computer inbuilt, or vehicle-mounted mobile device, and it may also be other network side device with a capacity of receiving information sent by a base station.

Figure 1:
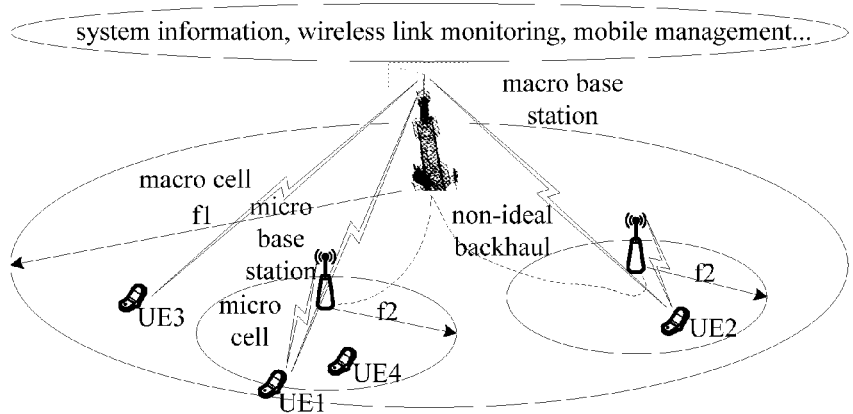
FIG. 1 is a scene graph of an uplink transmission method in an embodiment of the present invention.

FIG. 1 is a scene graph of an uplink transmission method in an embodiment of the present invention.

As shown in FIG. 1, a scenario where a macro cell and a micro cell are coupled is composed of a macro cell deployed at frequency f1 and multiple micro cells, locating in a coverage of the macro cell, deployed at frequency f2. Non-ideal backhauls lie both between the above-mentioned macro cell and the micro cells and among the micro cells, wherein UE1 and UE2 communicate with the macro cell and the micro cells at the same time.

Taking UE1 as an example, the UE1 sends a BSR to a macro base station. After receiving the BSR, the macro base station may perform, according to its own load condition and service types of the logical channel groups of the UE1, an allocation to determine data of which logical channel group is received by the macro base station and data of which logical channel groups is received by a micro base station. Then, the macro base station notifies the micro base station of a logical channel group expected to be received by the micro base station and data buffer status information of the logical channel group. The micro base station may determine, according to its own load condition and scheduling condition, that the allocation manner of the macro base station is accepted, not accepted or partially accept, and send a feedback to the macro base station. After the allocation of the uplink data of the UE1 is determined by the macro base station and the micro base station, the allocation result is notified to UE1. and, for example, it may be notified by the macro base station or the micro base station. Alternatively, a logical channel to be received by the macro base station is notified by the macro base station, and a logical channel to be received by the micro base station is notified by the micro base station.

In an embodiment of the present invention, during an uplink transmission, the macro base station and the micro base station, through coordinating, determine a split manner of uplink data, thus improving a flexibility of the uplink transmission.

Figure 2:
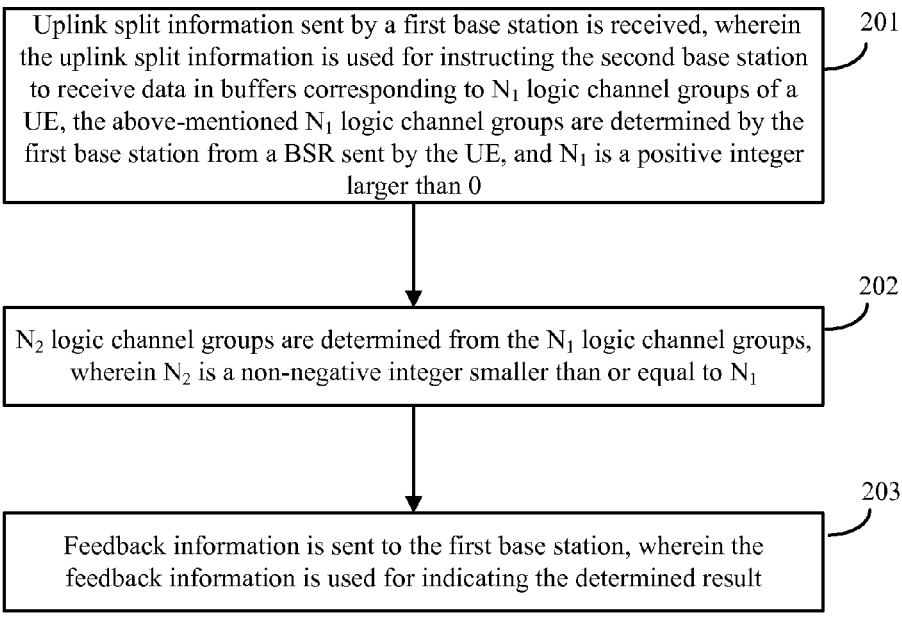
FIG. 2 is a flowchart of an uplink transmission method in an embodiment of the present invention.

FIG. 2 is a flowchart of an uplink transmission method in an embodiment of the present invention. The method of FIG. 2 may be implemented by a second base station, and, for example, it may be the micro base station in FIG. 1.

201. Uplink split information sent by a first base station is received, wherein the uplink split information is used for instructing the second base station to receive data in buffers corresponding to $N_1$ logic channel groups of a UE, the above-mentioned $N_1$ logic channel groups are determined by the first base station from a BSR sent by the UE, and $N_1$ is a positive integer larger than 0.

202. $N_2$ logic channel groups are determined from the $N_1$ logic channel groups, wherein $N_2$ is a non-negative integer smaller than or equal to $N_1$.

203. Feedback information is sent to the first base station, wherein the feedback information is used for indicating the determined result.

In the embodiment of the present invention, during an uplink transmission, the macro base station and the micro base station determine, through coordinating, the split manner of uplink data, thus improving a flexibility of the uplink transmission.

It should be understood that, in step 201, the first base station may be a control base station of the UE, namely, a base station keeping an RRC connection with the UE. For example, it may be the macro base station in FIG. 1.

Optionally, as an embodiment, in step 201, the uplink split information may include an identifier of the UE, identifiers of the $N_1$ logic channel groups and data status of data in buffers corresponding to the $N_1$ logic channel groups. The data status of the data in the buffers corresponding to the $N_1$ logic channel groups may be indicated by the BSR. For example, the first base station receives BSR of $N_3$ logic channel groups of the UE, and then directly forwards BSR of the $N_1$ logic channel groups therein to the second base station.

It should be understood that, in the embodiment of the present invention, in step 202, the specific manner of determining the $N_2$ logic channel groups from the $N_1$ logic channel groups is not limited.

Optionally, as an embodiment, data in buffers corresponding to $N_2$ logic channel groups are determined to be received according to the uplink split information, a load condition of the second base station, a channel quality condition between the second base station and the UE and the like. In the embodiment of the present invention, during an uplink split, by considering the load condition of the micro base station, load unbalance caused by uplink split between the macro base station and the micro base station is avoided, thereby making a utilization of a frequency spectrum of a system more reasonable.

For example, when a service load of the second base station is low, all data in buffers corresponding to the $N_1$ logic channel groups may be received, and $N_1$ equals to $N_2$ herein. When the service load of the second base station is high, a reception of data in buffers corresponding to a part of logic channel groups in the $N_1$ logic channel groups may be selected, and $N_2$ is smaller than $N_1$ herein. Certainly, that, a size of data in a buffer corresponding to each logic channel group and/or a requirement on a quality of a service of data and the like, may be considered comprehensively to determine data in buffers corresponding to which logic channel groups in the $N_1$ logic channel groups are to be received. Here is another example, data in buffers corresponding to more logic channel groups may be selectively received under a condition that a channel quality condition between the second base station and the UE is better, and vice versa. Optionally, no reception of data in buffers corresponding to the $N_1$ logic channel groups may also be selected, and $N_2$ is equal to 0 herein.

Optionally, the $N_2$ logic channel groups may be randomly determined from the $N_1$ logic channel groups or determined according to a preset rule.

Optionally, a manner of not sending feedback information to the first base station may be adopted to indicate that the second base station determines to receive all the data in the buffers corresponding to the $N_1$ logic channel groups. Alternatively, the manner of not sending the feedback information to the first base station may be adopted to indicate that the second base station determines not to receive the data in the buffers corresponding to the $N_1$ logic channel groups.

Optionally, as another embodiment, the method in FIG. 1 may further include: sending first indication information to the UE, wherein the first indication information is used for indicating the second base station will receive data in buffers corresponding to the $N_2$ logic channel groups. For example, identifier information of the $N_2$ logic channel groups is carried in the indication information.

Optionally, as another embodiment, before sending the first indication information to the UE, the method further includes: receiving second indication information sent by the first base station, wherein the second indication information includes identifiers of $N_3$ logic channel groups of the UE, which are about to transmit data, $N_3$ is a positive integer larger than or equal to $N_1$, and the first indication information is further used for indicating the first base station will receive data in buffers corresponding to rest logic channel groups, wherein the rest logic channel groups are rest logic channel groups when the $N_2$ logic channel groups are excluded from the $N_3$ logic channel groups. For example, four logic channel groups of the UE are about to send uplink data to the first base station and are respectively marked as 0, 1, 2 and 3. And each logic channel group corresponds to one buffer, marked as Buffer 0, Buffer 1, Buffer 2 and Buffer 3. Each Buffer corresponds to one BSR, marked as BSR #0, BSR #1, BSR #2 and BSR #3. If the first base station instructs the second base station to receive data in the Buffer 2 and the Buffer 3, and the second base station only receives data in the Buffer 2, then the above-mentioned rest logic channel groups are the Buffer 0, the Buffer 1 and the Buffer 3.

Optionally, when $N_2$ equals to 0, the second base station may send indication information to the UE, for indicating the second base station will not receive uplink data of the UE. Also, the second base station may send no indication information to indicate that the second base station will not receive the uplink data of the UE.

Optionally, as another embodiment, the above-mentioned determined result is used for indicating the second base station will receive data in buffers corresponding to the $N_2$ logic channel groups, and the method of FIG. 2 further includes: sending uplink scheduling information to the UE, wherein the uplink scheduling information is used for instructing the UE to send the data in the buffers corresponding to the $N_2$ logic channel groups to the second base station.

For example, the uplink scheduling information may include information of a resource granted by an uplink scheduling, so that the UE may send the data in the buffers corresponding to the $N_2$ logic channel groups to the second base station on the resource granted by the uplink scheduling.

Optionally, as another embodiment, $N_2$ equals to 0, and the above-mentioned determined result is used for indicating the second base station will not receive the data in the buffers corresponding to the $N_1$ logic channel groups.

In combination with FIG. 2, the uplink transmission method according to an embodiment of the present invention has been described above in detail from a perspective of the second base station. In combination with FIG. 3, the uplink transmission method according to an embodiment of the present invention will be described from a perspective of the first base station.

It should be understood that, the interaction and related features, functions and the like among the first base station, the second base station and the UE described in a side of the first base station correspond to description in a side of second base station, and for concision, it will not be repeated redundantly hereafter.

Figure 3:
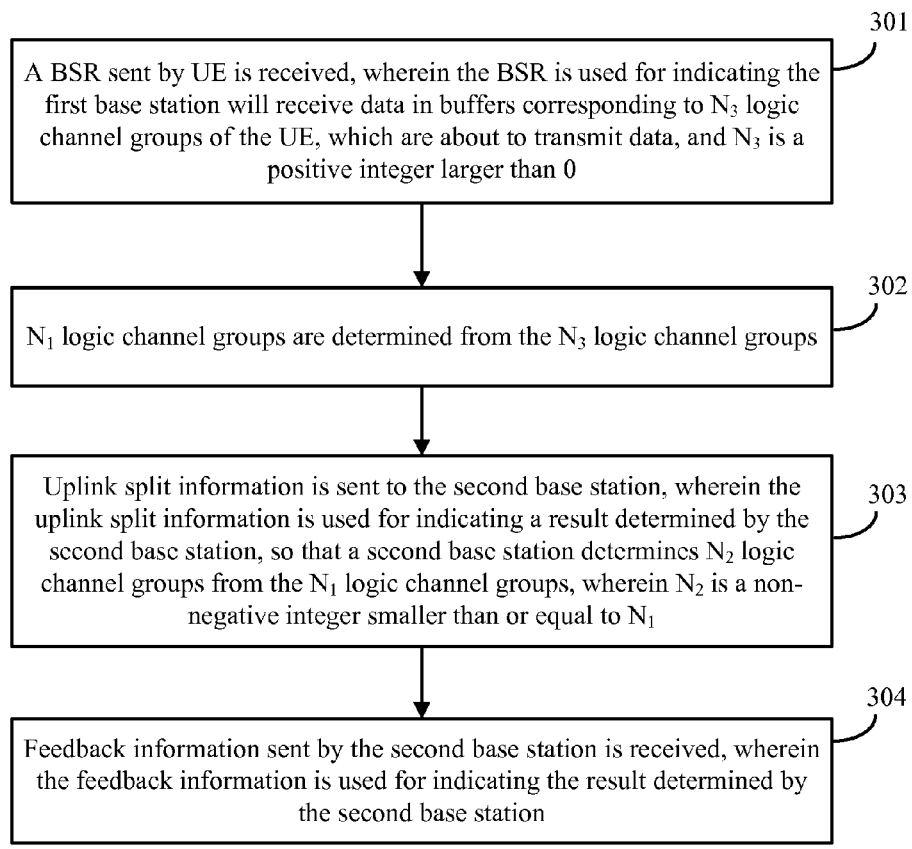
FIG. 3 is a flowchart of an uplink transmission method in another embodiment of the present invention.

FIG. 3 is a flowchart of an uplink transmission method in another embodiment of the present invention. The method of FIG. 3 may be implemented by a first base station. For example, it may be the macro base station in FIG. 1.

301. A BSR sent by UE is received, wherein the BSR is used for indicating the first base station will receive data in buffers corresponding to $N_3$ logic channel groups of the UE, which are about to transmit data, and $N_3$ is a positive integer larger than 0.

302. $N_1$ logic channel groups are determined from the $N_3$ logic channel groups, so that a second base station determines $N_2$ logic channel groups from the $N_1$ logic channel groups, wherein $N_2$ is a non-negative integer smaller than or equal to $N_1$.

303. Uplink split information is sent to the second base station, wherein the uplink split information is used for indicating a result determined by the second base station.

304. Feedback information sent by the second base station is received, wherein the feedback information is used for indicating the result determined by the second base station.

In the embodiment of the present invention, during an uplink transmission, the macro base station and the micro base station, through coordinating, determine a split manner of the uplink data, thus improving a flexibility of the uplink transmission.

It should be understood that, the BSR in step 301 refers to a group of BSRs. For example, four logic channel groups of the UE are about to send uplink data to the first base station and are respectively marked as 0, 1, 2 and 3. And each logic channel group corresponds to one buffer, marked as Buffer 0, Buffer 1, Buffer 2 and Buffer 3. Each Buffer corresponds to one BSR, marked as BSR #0, BSR #1, BSR #2 and BSR #3. Under this condition, the BSR in step 301 refers to BSR #0, BSR #1, BSR #2 and BSR #3.

It should be noted that, in the embodiment of the present invention, in step 302, the specific manner of determining the $N_1$ logic channel groups from the $N_3$ logic channel groups is not limited. For example, the second base station may be determined to receive the data in the buffers corresponding to the $N_1$ logic channel groups according to at least one of followings: a load condition of the first base station, a load condition of the second base station and a service type of each logic channel group in the $N_3$ logic channel groups. In the embodiment of the present invention, during an uplink split, by comprehensively considering service types and load conditions of the micro base station and the micro base station, uplink split load unbalance caused by merely considering the service types is avoided, making a utilization of frequency spectrum of the system more reasonable.

Optionally, as an embodiment, the method of FIG. 3 may further include: sending indication information to the UE, wherein the indication information is used for indicating the UE that the second base station will receive data in buffers corresponding to the $N_2$ logic channel groups. Optionally, the above-mentioned indication information may be further used for indicating the UE that the first base station will receive data in buffers corresponding to rest logic channel groups, wherein the rest logic channel groups are rest logic channel groups when the $N_2$ logic channel groups are excluded from the $N_3$ logic channel groups.

Optionally, as another embodiment, the method of FIG. 3 may further include: sending uplink scheduling information to the UE, wherein the uplink scheduling information is used for instructing the UE to send data in buffers corresponding to rest logic channel groups to the first base station, and the rest logic channel groups are rest logic channel groups when the $N_2$ logic channel groups are excluded from the $N_3$ logic channel groups.

For example, the uplink scheduling information may include information of a resource granted by an uplink scheduling, so that the UE sends data in buffers corresponding to the above-mentioned $N_3$ logic channel groups to the first base station on the resource granted by the uplink scheduling.

Optionally, as another embodiment, in step 303, the uplink split information includes an identifier of the UE and a data status of data in buffers corresponding to the $N_1$ logic channel groups.

Optionally, as another embodiment, according to a preset rule, when the feedback information sent by the second base station is not received, for example, under the condition that the feedback information sent by the second base station is not received within a preset duration, it may indicate that the second base station will receive all data in the buffers corresponding to the $N_1$ logic channel groups or indicate that the second base station determines it will not receive the data in the buffers corresponding to the $N_1$ logic channel groups.

Optionally, as another embodiment, the result determined by the second base station is used for indicating the second base station will receive the data in the buffers corresponding to the $N_2$ logic channel groups.

Optionally, as another embodiment, $N_2$ equals to 0, and the result determined by the second base station is used for indicating the second base station will not receive the data in the buffers corresponding to the $N_1$ logic channel groups.

In combination with FIG. 2 and FIG. 3, the uplink transmission method according to the embodiment of the present invention has been described above in detail from perspectives of the first base station and the second base station, and in combination with FIG. 4, the uplink transmission method according to the embodiment of the present invention will be described from a perspective of the UE.

It should be understood that, interactions, related features, functions and the like among the first base station, the second station and the UE described at the first base station side and the second base station side correspond to description at the UE side. For concision, it will not be repeated redundantly hereafter.

Figure 4:
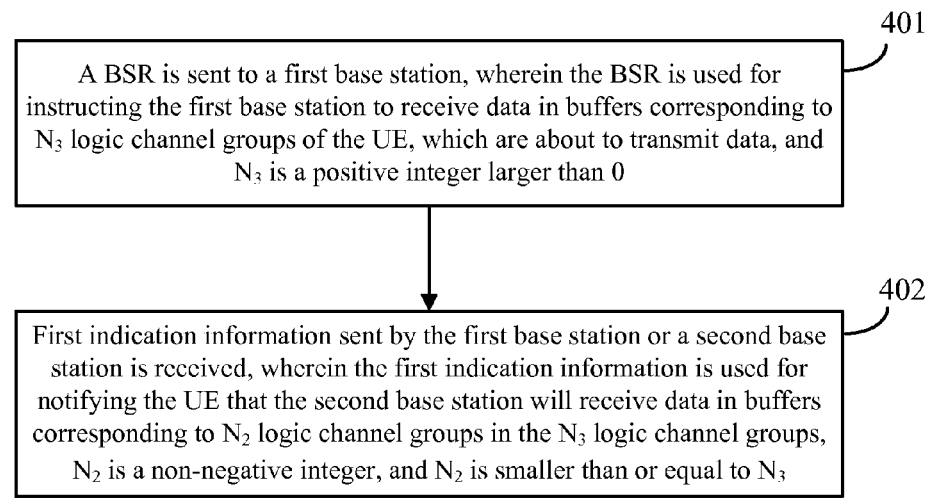
FIG. 4 is a flowchart of an uplink transmission method in another embodiment of the present invention.

FIG. 4 is a flowchart of an uplink transmission method in another embodiment of the present invention. The method of FIG. 4 may be implemented by a UE. For example, it may be UE1 or UE2 in FIG. 1.

401. A BSR is sent to a first base station, wherein the BSR is used for instructing the first base station to receive data in buffers corresponding to $N_3$ logic channel groups of the UE, which are about to transmit data, and $N_3$ is a positive integer larger than 0.

402. First indication information sent by the first base station or a second base station is received, wherein the first indication information is used for notifying the UE that the second base station will receive data in buffers corresponding to $N_2$ logic channel groups in the $N_3$ logic channel groups, $N_2$ is a non-negative integer, and $N_2$ is smaller than or equal to $N_3$.

In the embodiment of the present invention, during an uplink transmission, the macro base station and the micro base station determine, by coordinating, a split manner of uplink data, thus improving a flexibility of the uplink transmission.

Optionally, as another embodiment, the method of FIG. 4 further includes: receiving second indication information sent by the first base station or the second base station, wherein the second indication information is used for notifying the UE that the first base station will receive data in buffers corresponding to rest logic channel groups, and the rest logic channel groups are rest logic channel groups when the $N_2$ logic channel groups are excluded from the $N_3$ logic channel groups.

It should be noted that, the above-mentioned first indication information and the second indication information may be sent together, for example, being carried in a same message. It may also be separately sent, for example, being carried in different messages. Optionally, the first base station may both send the first indication information and the second indication information; the second base station may also both send the first indication information and the second indication information; or, the first base station sends the second indication information and the second base station sends the first indication information. This is not limited in the embodiment of the present invention.

Optionally, as another embodiment, the method of FIG. 4 further includes: receiving uplink scheduling information sent by the first base station, wherein the uplink scheduling information sent by the first base station is used for instructing the UE to send data in buffers corresponding to rest logic channel groups to the first base station, and the rest logic channel groups are rest logic channel groups when the $N_2$ logic channel groups are excluded from the $N_3$ logic channel groups; and receiving the uplink scheduling information sent by the second base station, wherein the uplink scheduling information sent by the second base station is used for instructing the UE to send the data in the buffers corresponding to the $N_2$ logic channel groups to the second base station.

The embodiments of the present invention will be described below in more detail in combination with specific examples. It should be noted that, the examples of FIG. 5 to FIG. 8 are merely used for helping those skilled in the art understand the embodiments of the present invention, rather than limit the embodiments of the present invention to a specific numerical value or a specific scenario as shown in the examples. Apparently, those skilled in the art may make various equivalent modifications or variations according to the examples of FIG. 5 to FIG. 8, and these modifications or variations shall fall within the scope of the embodiments of the present invention.

It should be understood that, in the embodiments as shown in FIG. 5 to FIG. 8, four logic channel groups of a UE are about to send uplink data to a first base station, which are respectively marked as 0, 1, 2 and 3. Each logic channel group corresponds to one buffer, marked as Buffer 0, Buffer 1, Buffer 2 and Buffer 3. Each Buffer corresponds to one BSR, marked as BSR #0, BSR #1, BSR #2 and BSR #3. However, the embodiments of the present invention are not limited herein. For example, the data of 5 or more logic channel groups of the UE need to be sent to the first base station, or the data of 3 or less logic channel groups of the UE need to be sent to the first base station. Moreover, in the embodiments as shown in FIG. 5 to FIG. 8, it is taken as an example for illustration that the first base station indicates the second base station to receive uplink data in the Buffer 2 and the Buffer 3 of the UE. However, the embodiments of the present invention are not limited herein, for example, the first base station may instruct the second base station to receive the uplink data in the Buffer 0, the Buffer 1 and the Buffer 2 of the UE.

Figure 5:
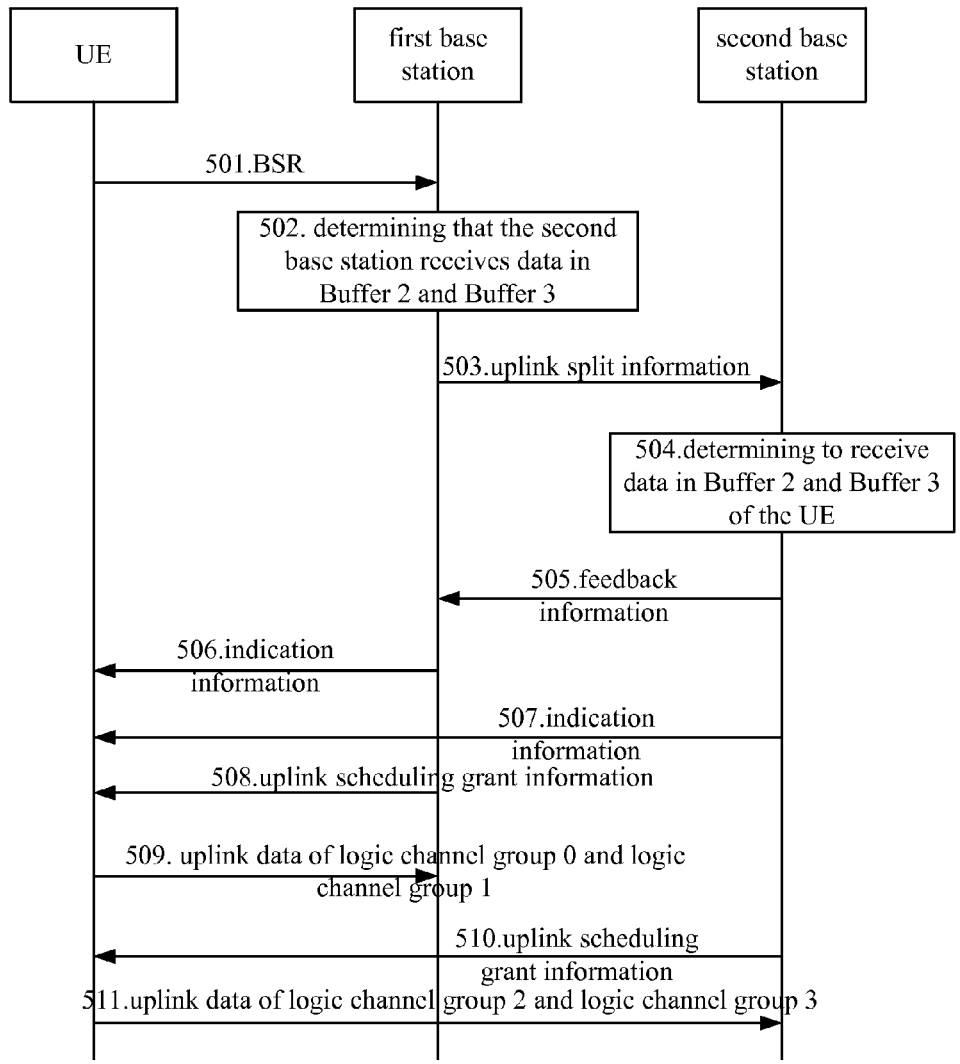
FIG. 5 is a flowchart of an uplink transmission method in another embodiment of the present invention.

FIG. 5 is a flowchart of an uplink transmission method in another embodiment of the present invention. The embodiment of FIG. 5 is an example of the embodiments of FIG. 2 to FIG. 4. In FIG. 5, the first base station instructs the second base station to receive uplink data in the Buffer 2 and the Buffer 3 of the UE, and the second base station agrees to receive the uplink data in the Buffer 2 and the Buffer 3.

501. The UE sends a BSR to the first base station. The BSR is used for instructing the first base station to receive data in the Buffer 0, the Buffer 1, the Buffer 2 and the Buffer 3 corresponding to the logic channels 0, 1, 2 and 3.

502. The first base station determines that the second base station receives data in the Buffer 2 and the Buffer 3. The determination may be made according to a service type of each logic channel group, according to load conditions of a macro base station and a micro base station, or according to the combination of the above-mentioned manners, which is not limited in the embodiment of the present invention.

503. The first base station sends uplink split information to the second base station. The uplink split information is used for indicating the second base station to receive the data in the Buffer 2 corresponding to the logic channel group 2 and the Buffer 3 corresponding to the logic channel group 3 of the UE. The uplink split information may include an identifier of the UE, identifiers of the Buffer 2 and the Buffer 3, the BSR #2 and the BSR #3.

504. The second base station determines to receive the data in the Buffer 2 and the Buffer 3 of the UE. The determination may be made according to a service condition or scheduling condition of the micro base station.

505. The second base station sends feedback information to the first base station. The feedback information is used for indicating that the second base station agrees to receive the data in the Buffer 2 and the Buffer 3 of the UE to the first base station. The feedback information may include the identifier of the UE, identifiers of the logic channel groups 2, 3 corresponding to the Buffer 2 and the Buffer 3, the BSR #2 and the BSR #3.

506. The first base station sends indication information to the UE, wherein the indication information is used for notifying the UE that the first base station will receive the uplink data of the logic channel group 0 and the logic channel group 1.

507. The second base station sends indication information to the UE, wherein the indication information is used for notifying the UE that the second base station will receive the uplink data of the logic channel group 2 and the logic channel group 3.

508. The first base station sends uplink scheduling grant information to the UE.

509. The UE sends the uplink data of the logic channel group 0 and the logic channel group 1 to the first base station based on the uplink scheduling grant information.

510. The second base station sends uplink scheduling grant information to the UE.

511. The UE sends the uplink data of the logic channel group 2 and the logic channel group 3 to the second base station based on the uplink scheduling grant information.

In the embodiment of the present invention, during an uplink transmission, the macro base station and the micro base station determine, by coordinating, a split manner of uplink data, thus improving a flexibility of the uplink transmission.

Figure 6:
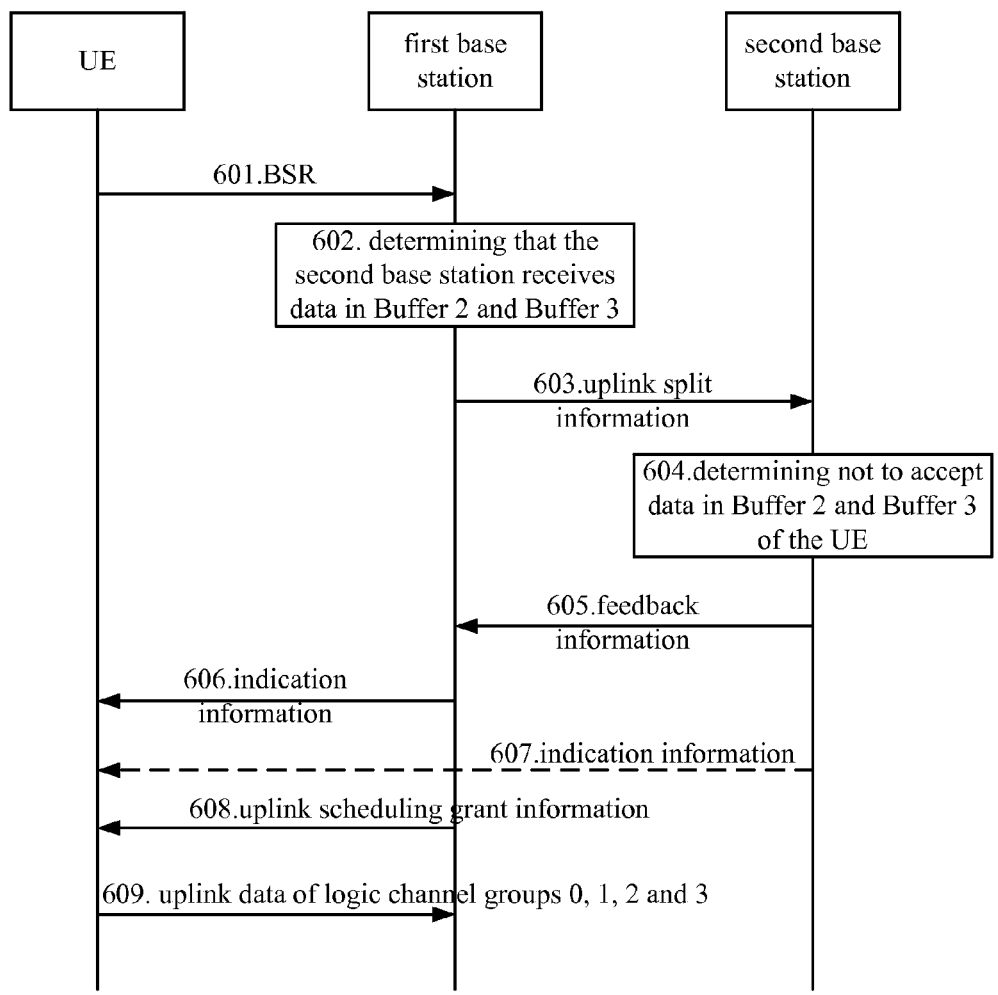
FIG. 6 is a flowchart of an uplink transmission method in another embodiment of the present invention.

FIG. 6 is a flowchart of an uplink transmission method in another embodiment of the present invention. The embodiment of FIG. 6 is an example of the embodiments of FIG. 2 to FIG. 4. In FIG. 6, the first base station instructs the second base station to receive the uplink data in the Buffer 2 and the Buffer 3 of the UE, and the second base station refuses to receive the uplink data in the Buffer 2 and the Buffer 3.

601. The UE sends a BSR to the first base station. The BSR is used for instructing the first base station to receive the data in the Buffer 0, the Buffer 1, the Buffer 2 and the Buffer 3 corresponding to the logic channels 0, 1, 2 and 3.

602. The first base station determines that the second base station receives the data in the Buffer 2 and the Buffer 3. The determination may be made according to a service type of each logic channel group, according to load conditions of the macro base station and the micro base station, or according to the combination of the above-mentioned manners, which is not limited in the embodiment of the present invention.

603. The first base station sends uplink split information to the second base station. The uplink split information is used for instructing the second base station to receive the data in the Buffer 2 corresponding to the logic channel group 2 and the Buffer 3 corresponding to the logic channel group 3 of the UE. The uplink split information may include an identifier of the UE, identifiers of the Buffer 2 and the Buffer 3, the BSR #2 and the BSR #3.

604. The second base station determines not to accept the data in the Buffer 2 and the Buffer 3 of the UE. The determination may be made according to a service condition or scheduling condition of the micro base station.

605. The second base station sends feedback information to the first base station. The feedback information is used for indicating that the second base station refuses to receive the data in the Buffer 2 and the Buffer 3 of the UE to the first base station.

606. The first base station sends indication information to the UE, wherein the indication information is used for notifying the UE that the first base station will receive the uplink data in the logic channel groups 0, 1, 2 and 3 of the UE.

607. The second base station sends indication information to the UE, wherein the indication information is used for notifying the UE that the second base station will not receive the uplink data of the UE. Optionally, the indication information may not be sent to the UE.

608. The first base station sends uplink scheduling grant information to the UE.

609. The UE sends the uplink data of the logic channel groups 0, 1, 2 and 3 to the first base station based on the uplink scheduling grant information.

In the embodiment of the present invention, during an uplink transmission, the macro base station and the micro base station determine, by coordinating, a split manner of uplink data, thus improving a flexibility of the uplink transmission.

Figure 7:
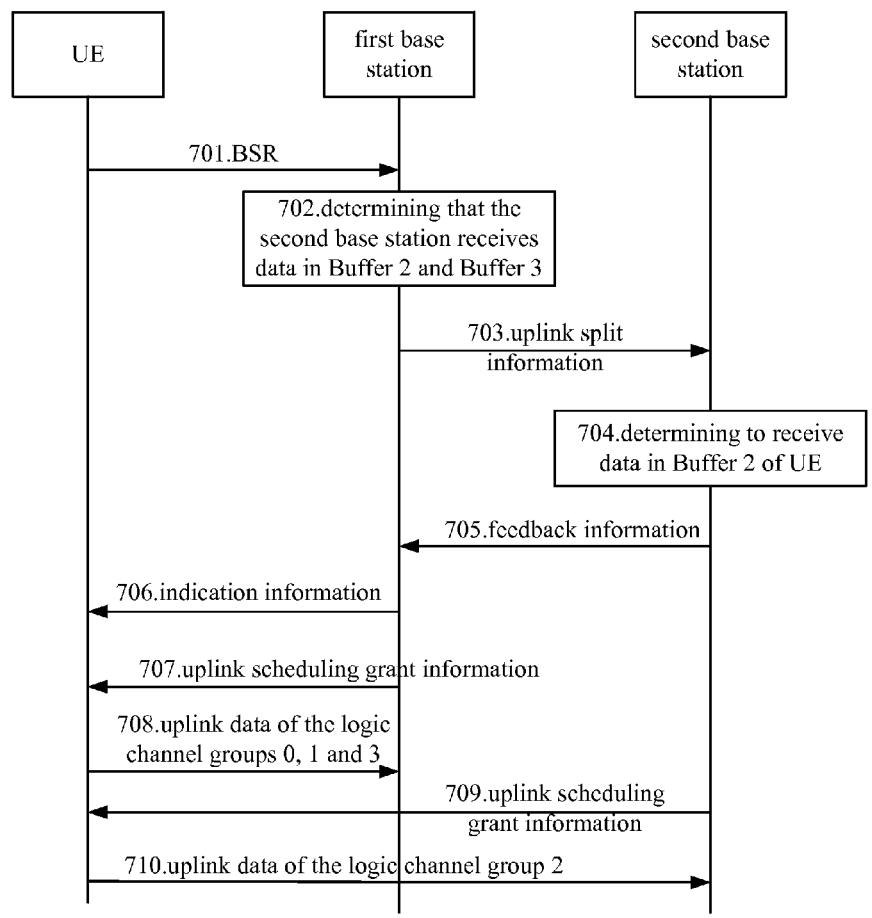
FIG. 7 is a flowchart of an uplink transmission method in another embodiment of the present invention.

FIG. 7 is a flowchart of an uplink transmission method in another embodiment of the present invention. The embodiment of FIG. 7 is an example of the embodiments of FIG. 2 to FIG. 4. In FIG. 7, the first base station instructs the second base station to receive uplink data in the Buffer 2 and the Buffer 3 of the UE, and the second base station agrees to receive uplink data in the Buffer 2.

701. The UE sends a BSR to the first base station. The BSR is used for instructing the first base station to receive the data in the Buffer 0, the Buffer 1, the Buffer 2 and the Buffer 3 corresponding to the logic channels 0, 1, 2 and 3.

702. The first base station determines that the second base station receives the data in the Buffer 2 and the Buffer 3. The determination may be made according to a service type of each logic channel group, according to load conditions of the macro base station and the micro base station, or according to the combination of the above-mentioned manners, which is not limited in the embodiment of the present invention.

703. The first base station sends uplink split information to the second base station. The uplink split information is used for instructing the second base station to receive the data in the Buffer 2 corresponding to the logic channel group 2 and the Buffer 3 corresponding to the logic channel group 3 of the UE. The uplink split information may include an identifier of the UE, identifiers of the Buffer 2 and the Buffer 3, the BSR #2 and the BSR #3.

704. The second base station determines to receive the data in the Buffer 2 of the UE. For example, the determination may be made according to a service condition or scheduling condition of the micro base station.

705. The second base station sends feedback information to the first base station. The feedback information is used for indicating that the second base station agrees to receive the data in the Buffer 2 of the UE to the first base station. The feedback information may include an identifier of the UE, an identifier of the Buffer 2 and the BSR #2.

706. The first base station sends indication information to the UE, wherein the indication information is used for notifying the UE that the first base station will receive the uplink data in the logic channel groups 0, 1 and 3 and the second base station will receive the uplink data in the logic channel group 2.

707. The first base station sends uplink scheduling grant information to the UE.

708. The UE sends the uplink data of the logic channel groups 0, 1 and 3 to the first base station.

709. The second base station sends the uplink scheduling grant information to the UE.

710. The UE sends the uplink data of the logic channel group 2 to the second base station based on the uplink scheduling grant information.

In the embodiment of the present invention, during an uplink transmission, the macro base station and the micro base station determine, by coordinating, a split manner of uplink data, thus improving a flexibility of the uplink transmission.

The uplink transmission method according to the embodiment of the present invention has been described above in detail in combination with FIG. 1 to FIG. 7. A user equipment and a base station according to the embodiment of the present invention will be described below in detail in combination with FIG. 8 to FIG. 13.

Figure 8:
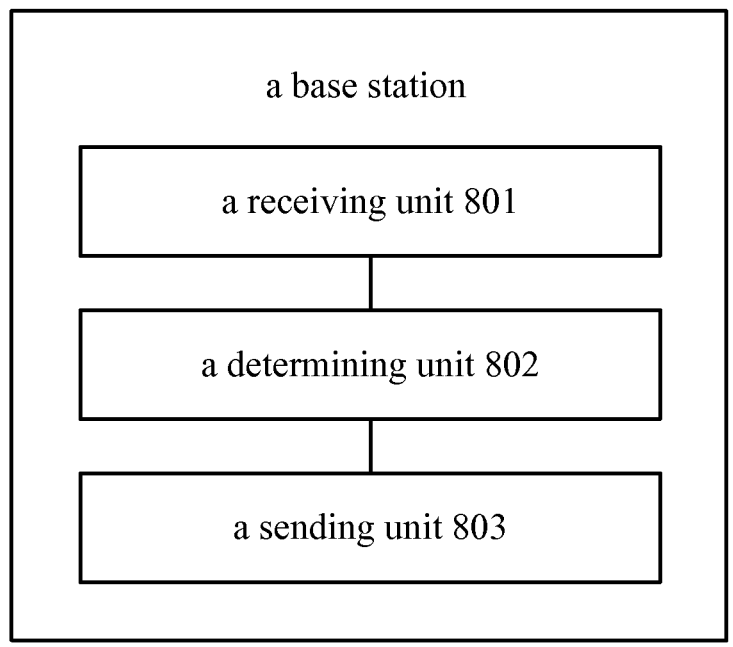
FIG. 8 is a block diagram of a base station in an embodiment of the present invention.

FIG. 8 is a block diagram of a base station in an embodiment of the present invention. The base station of FIG. 8 includes a receiving unit 801, a determining unit 802 and a sending unit 803. The base station of FIG. 8 may achieve each step implemented by the second base station in FIG. 2 to FIG. 7, and in order to avoid repetition, it will not be described in detail.

The receiving unit 801 is configured to receive uplink split information sent by a first base station, wherein the uplink split information is used for instructing the base station to receive data in buffers corresponding to $N_1$ logic channel groups of a user equipment UE, the $N_1$ logic channel groups are determined by the first base station from a buffer status report BSR sent by the UE, and $N_1$ is a positive integer larger than 0.

The determining unit 802 is configured to determine $N_2$ logic channel groups from the $N_1$ logic channel groups, wherein $N_2$ is a non-negative integer smaller than or equal to $N_1$.

The sending unit 803 is configured to send feedback information to the first base station, wherein the feedback information is used for indicating the result determined by the determining unit 802.

In the embodiment of the present invention, during an uplink transmission, the macro base station and the micro base station determine, by coordinating, a split manner of uplink data, thus improving a flexibility of the uplink transmission.

Optionally, as an embodiment, the determining unit 802 is specifically configured to determine the $N_2$ logic channel groups from the $N_1$ logic channel groups according to at least one of followings:

the uplink split information, a load condition of the second base station and a channel quality between the second base station and the UE.

Optionally, as another embodiment, the sending unit 803 is further configured to send first indication information to the UE, wherein the first indication information is used for indicating the second base station will receive the data in the buffers corresponding to the $N_2$ logic channel groups.

Optionally, as another embodiment, the receiving unit 803 is further configured to receive second indication information sent by the first base station, wherein the second indication information includes identifiers of $N_3$ logic channel groups of the UE which are about to transmit data, $N_3$ is a positive integer larger than or equal to $N_1$, and the first indication information is further used for indicating the first base station will receive data in buffers corresponding to rest logic channel groups, wherein the rest logic channel groups are rest logic channel groups when the $N_2$ logic channel groups are excluded from the $N_3$ logic channel groups.

Optionally, as another embodiment, the above-mentioned determined result is used for indicating the second base station will receive the data in the buffers corresponding to the $N_2$ logic channel groups, and the sending unit 803 is further configured to send uplink scheduling information to the UE, wherein the uplink scheduling information is used for instructing the UE to send the data in the buffers corresponding to the N2 logic channel groups to the second base station.

Optionally, as another embodiment, the uplink split information includes an identifier of the UE and a data status of the data in the buffers corresponding to the N1 logic channel groups.

Optionally, as another embodiment, $N_2$ equals to 0, and the above-mentioned determined result is used for indicating the second base station will not receive the data in the buffers corresponding to the $N_1$ logic channel groups.

Figure 9:
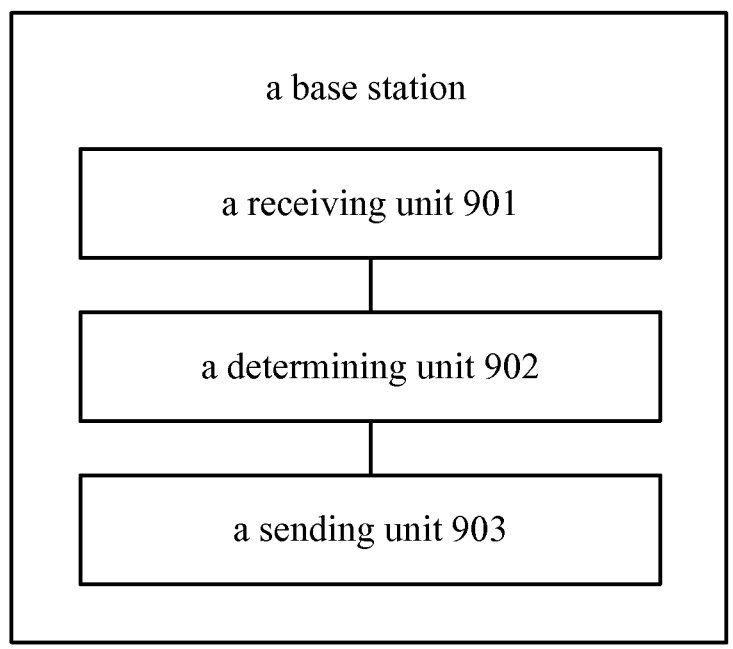
FIG. 9 is a block diagram of a base station in another embodiment of the present invention.

FIG. 9 is a block diagram of a base station in another embodiment of the present invention. The base station of FIG. 9 includes a receiving unit 901, a determining unit 902 and a sending unit 903. The base station of FIG. 9 may achieve each step implemented by the first base station in FIG. 2 to FIG. 7, and in order to avoid repetition, it will not be described in detail.

The receiving unit 901 is configured to receive a buffer status report BSR sent by a user equipment UE, wherein the BSR is used for instructing a base station to receive data in buffers corresponding to $N_3$ logic channel groups of the UE, which are about to transmit data, and $N_3$ is a positive integer larger than 0.

The determining unit 902 is configured to determine $N_1$ logic channel groups from the $N_3$ logic channel groups.

The sending unit 903 is configured to send uplink split information to a second base station, wherein the uplink split information is used for instructing the second base station to receive the data in the buffers corresponding to the $N_1$ logic channel groups, so as to enable the second base station to determine $N_2$ logic channel groups from the $N_1$ logic channel groups, and $N_2$ is a non-negative integer smaller than or equal to $N_1$.

The receiving unit 901 is further configured to receive feedback information sent by the second base station, and the feedback information is used for indicating the result determined by the second base station.

In the embodiment of the present invention, during an uplink transmission, the macro base station and the micro base station determine, by coordinating, a split manner of uplink data, thus improving a flexibility of the uplink transmission.

Optionally, as an embodiment, the determining unit 902 is specifically configured to determine the $N_1$ logic channel groups from the $N_3$ logic channel groups according to at least one of followings:

a load condition of the first base station, a load condition of the second base station and a service type of each logic channel group in the $N_3$ logic channel groups.

Optionally, as another embodiment, the sending unit 903 is further configured to send indication information to the UE, wherein the indication information is used for indicating the second base station will receive data in buffers corresponding to the $N_2$ logic channel groups.

Optionally, as another embodiment, the indication information is further used for indicating the first base station will receive data in buffers corresponding to rest logic channel groups, wherein the rest logic channel groups are rest logic channel groups when the $N_2$ logic channel groups are excluded from the $N_3$ logic channel groups.

Optionally, as another embodiment, the sending unit 903 is further configured to send uplink scheduling information to the UE, wherein the uplink scheduling information is used for instructing the UE to send data in buffers corresponding to the rest logic channel groups to the first base station, and the rest logic channel groups are rest logic channel groups when the $N_2$ logic channel groups are excluded from the $N_3$ logic channel groups.

Optionally, as another embodiment, the uplink split information includes an identifier of the UE and a data status of the data in the buffers corresponding to the $N_1$ logic channel groups.

Optionally, as another embodiment, the result determined by the second base station is used for indicating the second base station will receive data in buffers corresponding to the $N_2$ logic channel groups.

Optionally, as another embodiment, $N_2$ equals to 0, and the result determined by the second base station is used for indicating the second base station will not receive the data in the buffers corresponding to the $N_1$ logic channel groups.

Figure 10:
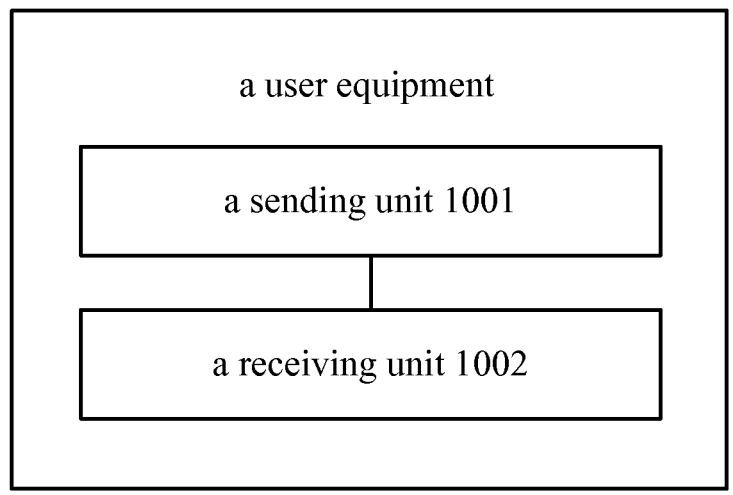
FIG. 10 is a block diagram of a UE in an embodiment of the present invention.

FIG. 10 is a block diagram of a UE in an embodiment of the present invention. The UE of FIG. 10 includes a sending unit 1001 and a receiving unit 1002. The UE of FIG. 10 may achieve each step implemented by the UE in FIG. 2 to FIG. 7, and in order to avoid repetition, it will not be described in detail.

The sending unit 1001 is configured to send a buffer status report BSR to a first base station, wherein the BSR is used for instructing the first base station to receive data in buffers corresponding to $N_3$ logic channel groups of the UE, which are about to transmit data, and $N_3$ is a positive integer larger than 0.

The receiving unit 1002 is configured to receive first indication information sent by the first base station or a second base station, wherein the first indication information is used for indicating the second base station will receive data in buffers corresponding to $N_2$ logic channel groups in the $N_3$ logic channel groups, and $N_2$ is a non-negative integer smaller than or equal to $N_3$.

In the embodiment of the present invention, during an uplink transmission, the macro base station and the micro base station determine, by coordinating, a split manner of uplink data, thus improving a flexibility of the uplink transmission.

Optionally, as an embodiment, the receiving unit 1002 is further configured to receive second indication information sent by the first base station or the second base station, wherein the second indication information is used for indicating the UE that the first base station will receive data in buffers corresponding to rest logic channel groups, and the rest logic channel groups are rest logic channel groups when the $N_2$ logic channel groups are excluded from the $N_3$ logic channel groups.

Optionally, as another embodiment, the receiving unit 1002 is further configured to receive uplink scheduling information sent by the first base station, wherein the uplink scheduling information sent by the first base station is used for instructing the UE to send data in buffers corresponding to rest logic channel groups to the first base station, and the rest logic channel groups are rest logic channel groups when the $N_2$ logic channel groups are excluded from the $N_3$ logic channel groups; and to receive uplink scheduling information sent by the second base station, wherein the uplink scheduling information sent by the second base station is used for instructing the UE to send the data in the buffers corresponding to the $N_2$ logic channel groups to the second base station.

Figure 11:
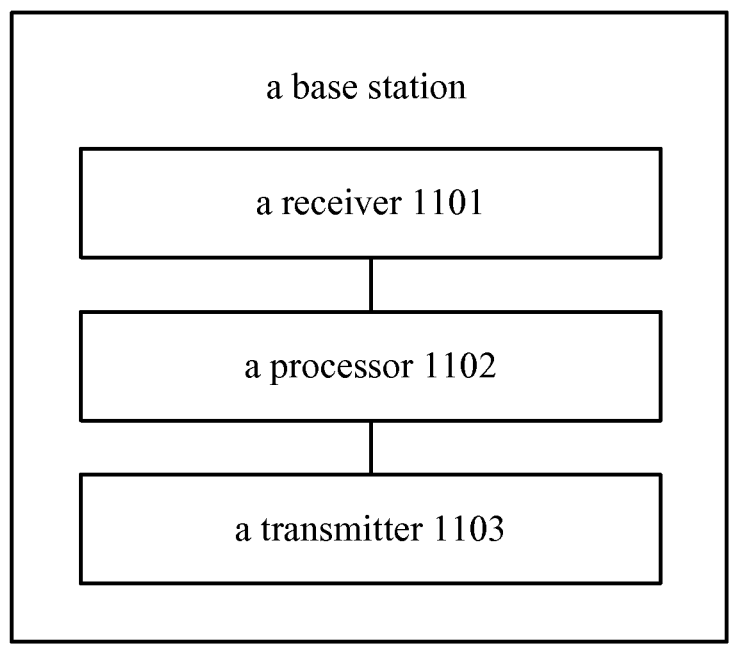
FIG. 11 is a block diagram of a base station in another embodiment of the present invention.

FIG. 11 is a block diagram of a base station in another embodiment of the present invention. The base station of FIG. 11 includes a receiver 1101, a processor 1102 and a transmitter 1103. The base station of FIG. 11 may achieve each step implemented by the second base station in FIG. 2 to FIG. 7, and in order to avoid repetition, it will not be described in detail.

The receiver 1101 is configured to receive uplink split information sent by a first base station, wherein the uplink split information is used for instructing the base station to receive data in buffers corresponding to $N_1$ logic channel groups of a user equipment UE, the $N_1$ logic channel groups are determined by the first base station from a buffer status report BSR sent by the UE, and $N_1$ is a positive integer larger than 0.

The processor 1102 is configured to determine $N_2$ logic channel groups from the $N_1$ logic channel groups, wherein $N_2$ is a non-negative integer smaller than or equal to $N_1$.

The transmitter 1103 is configured to send feedback information to the first base station, wherein the feedback information is used for indicating the result determined by the processor 1102.

In the embodiment of the present invention, during an uplink transmission, the macro base station and the micro base station determine, by coordinating, a split manner of uplink data, thus improving a flexibility of the uplink transmission.

Optionally, as an embodiment, the processor 1102 is specifically configured to determine the $N_2$ logic channel groups from the $N_1$ logic channel groups according to at least one of followings: the uplink split information, a load condition of the second base station and a channel quality between the second base station and the UE.

Optionally, as another embodiment, the transmitter 1103 is further configured to send first indication information to the UE, wherein the first indication information is used for indicating the second base station will receive the data in the buffers corresponding to the $N_2$ logic channel groups.

Optionally, as another embodiment, the receiver 1101 is further configured to receive second indication information sent by the first base station, wherein the second indication information includes identifiers of $N_3$ logic channel groups of the UE, which are about to transmit data, $N_3$ is a positive integer larger than or equal to $N_1$, and the first indication information is further used for indicating the first base station will receive data in buffers corresponding to rest logic channel groups, wherein the rest logic channel groups are rest logic channel groups when the $N_2$ logic channel groups are excluded from the $N_3$ logic channel groups.

Optionally, as another embodiment, the result determined by the processor 1102 is used for indicating the second base station will receive the data in the buffers corresponding to the $N_2$ logic channel groups, and the transmitter 1103 is further configured to send uplink scheduling information to the UE, wherein the uplink scheduling information is used for instructing the UE to send the data in the buffers corresponding to the $N_2$ logic channel groups to the second base station.

Optionally, as another embodiment, the uplink split information includes an identifier of the UE and a data status of the data in the buffers corresponding to the $N_1$ logic channel groups.

Optionally, as another embodiment, $N_2$ equals to 0, and the determined result is used for indicating the second base station will not receive the data in the buffers corresponding to the $N_1$ logic channel groups.

Figure 12:
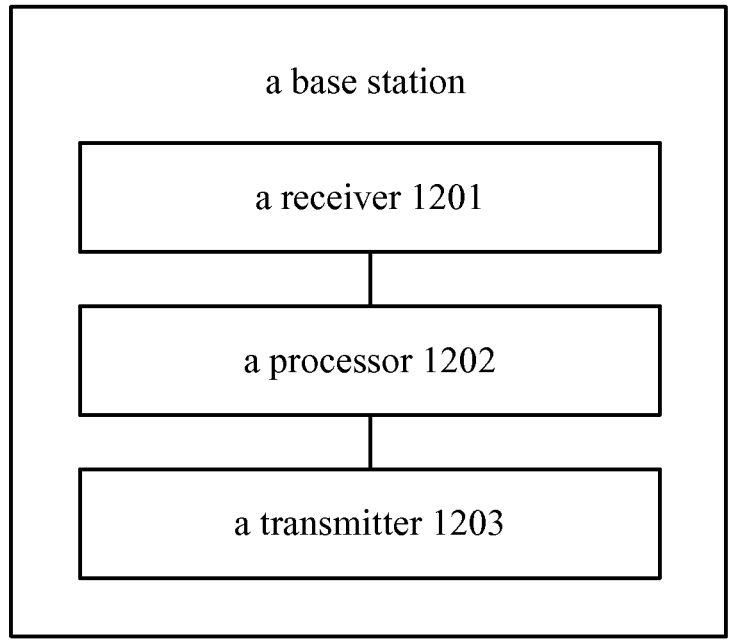
FIG. 12 is a block diagram of a base station in another embodiment of the present invention.

FIG. 12 is a block diagram of a base station in another embodiment of the present invention. The base station of FIG. 12 includes a receiver 1201, a processor 1202 and a transmitter 1203. The base station of FIG. 12 may achieve each step implemented by the first base station in FIG. 2 to FIG. 7, and in order to avoid repetition, it will not be described in detail.

The receiver 1201 is configured to receive a buffer status report BSR sent by a user equipment UE, wherein the BSR is used for instructing a base station to receive data in buffers corresponding to $N_3$ logic channel groups of the UE, which are about to transmit data, and $N_3$ is a positive integer larger than 0.

The processor 1202 is configured to determine N1 logic channel groups from the $N_3$ logic channel groups.

The transmitter 1203 is configured to send uplink split information to a second base station, wherein the uplink split information is used for instructing the second base station to receive data in buffers corresponding to the $N_1$ logic channel groups, so as to enable the second base station to determine $N_2$ logic channel groups from the $N_1$ logic channel groups, and $N_2$ is a non-negative integer smaller than or equal to $N_1$.

The receiver 1201 is further configured to receive feedback information sent by the second base station, and the feedback information is used for indicating the result determined by the second base station.

In the embodiment of the present invention, during an uplink transmission, the macro base station and the micro base station determine, by coordinating, a split manner of uplink data, thus improving a flexibility of the uplink transmission.

Optionally, as an embodiment, the processor 1202 is specifically configured to determine the $N_1$ logic channel groups from the $N_3$ logic channel groups according to at least one of followings: a load condition of the first base station, a load condition of a second base station and the service type of each logic channel group in the $N_3$ logic channel groups.

Optionally, as another embodiment, the transmitter 1203 is further configured to send indication information to the UE, wherein the indication information is used for indicating the second base station will receive data in buffers corresponding to the $N_2$ logic channel groups.

Optionally, as another embodiment, the indication information is further used for indicating the first base station will receive data in buffers corresponding to rest logic channel groups, wherein the rest logic channel groups are rest logic channel groups when the $N_2$ logic channel groups are excluded from the $N_3$ logic channel groups.

Optionally, as another embodiment, the transmitter 1203 is further configured to send uplink scheduling information to the UE, wherein the uplink scheduling information is used for instructing the UE to send data in buffers corresponding to rest logic channel groups to the first base station, and the rest logic channel groups are rest logic channel groups when the $N_2$ logic channel groups are excluded from the $N_3$ logic channel groups.

Optionally, as another embodiment, the uplink split information includes an identifier of the UE and a data status of the data in the buffers corresponding to the $N_1$ logic channel groups.

Optionally, as another embodiment, the result determined by the second base station is used for indicating the second base station will receive data in buffers corresponding to the $N_2$ logic channel groups.

Optionally, as another embodiment, $N_2$ equals to 0, and the determined result is used for indicating the second base station will not receive the data in the buffers corresponding to the $N_1$ logic channel groups.

Figure 13:
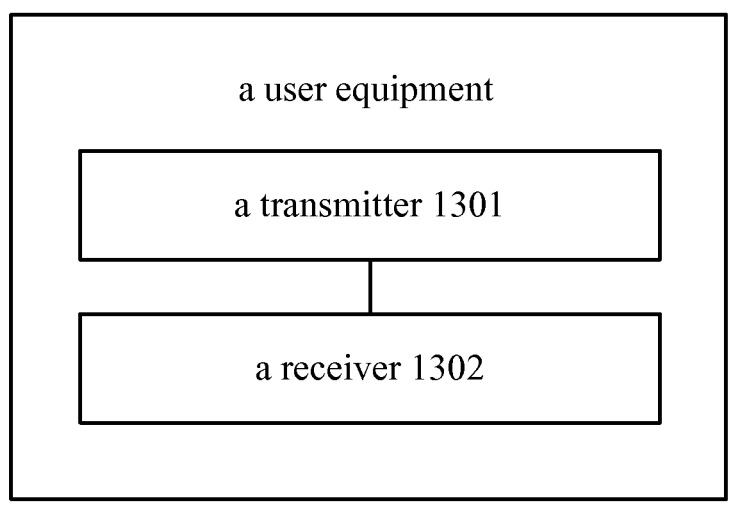
FIG. 13 is a block diagram of a UE in another embodiment of the present invention.

FIG. 13 is a block diagram of UE in another embodiment of the present invention. The UE of FIG. 13 includes a transmitter 1301 and a receiver 1302. The UE of FIG. 13 may achieve each step implemented by the UE in FIG. 2 to FIG. 7, and in order to avoid repetition, it will not be described in detail.

The transmitter 1301 is configured to send a buffer status report (BSR) to a first base station, wherein the BSR is used for instructing the first base station to receive data in buffers corresponding to $N_3$ logic channel groups of the UE, which are about to transmit data, and $N_3$ is a positive integer larger than 0.

The receiver 1302 is configured to receive first indication information sent by the first base station or a second base station, wherein the first indication information is used for indicating the second base station will receive data in buffers corresponding to $N_2$ logic channel groups in the $N_3$ logic channel groups, and $N_2$ is a non-negative integer smaller than or equal to $N_3$.

In the embodiment of the present invention, during an uplink transmission, the macro base station and the micro base station determine, by coordinating, a split manner of uplink data, thus improving a flexibility of the uplink transmission.

Optionally, as an embodiment, the receiver 1302 is further configured to receive second indication information sent by the first base station or the second base station, wherein the second indication information is used for indicating the UE that the first base station will receive data in buffers corresponding to rest logic channel groups, and the rest logic channel groups are rest logic channel groups when the $N_2$ logic channel groups are excluded from the $N_3$ logic channel groups.

Optionally, as another embodiment, the receiver 1302 is further configured to receive uplink scheduling information sent by the first base station, wherein the uplink scheduling information sent by the first base station is used for instructing the UE to send data in buffers corresponding to rest logic channel groups to the first base station, and the rest logic channel groups are rest logic channel groups when the $N_2$ logic channel groups are excluded from the $N_3$ logic channel groups; and to receive uplink scheduling information sent by the second base station, wherein the uplink scheduling information sent by the second base station is used for instructing the UE to send the data in the buffers corresponding to the $N_2$ logic channel groups to the second base station.

Those of ordinary skill in the art may be aware that, units and algorithm steps of the examples described in the embodiments disclosed in this description may be implemented by electronic hardware or a combination of computer software and the electronic hardware. Whether these functions are implemented in the form of hardware or software is determined by specific applications and design constraint conditions of the technical solutions. Those skilled may implement the described functions by using different methods for each specific application, but this implementation should not be considered as beyond the scope of the present invention.

Those skilled in the art to which the present invention pertains may clearly understand that, for convenience and concision of description, the specific working processes of the system, apparatus and units described above may refer to corresponding processes in the foregoing method embodiments, and will not be repeated redundantly herein.

In the several embodiments provided in the present application, it should be understood that, the disclosed system, apparatus and method may be implemented in other manners. For example, the apparatus embodiments described above are merely exemplary, e.g., the division of the units is only a logic function division, other division manners may exist in practical implementation, for example, multiple units or components may be combined or integrated to another system, or some features may be omitted or not implemented. From another point of view, the displayed or discussed mutual coupling or direct coupling or communication connection may be indirect coupling or communication connection of devices or units through some interfaces, and may be in electrical, mechanical or other forms.

The units described as separate components may be separated physically or not, components displayed as units may be physical units or not, namely, may be located in one place, or may also be distributed on multiple network units. A part of or all of the units may be selected to achieve the purposes of the technical solutions in the embodiments according to actual demand.

In addition, the functional units in the embodiments of the present invention may be integrated in a processing unit, or the units singly exist physically, or two or more units are integrated in one unit.

If the function is implemented in the form of a software functional unit and is sold or used as an independent product, it may be stored in a computer readable storage medium. Based on this understanding, the technical solutions of the present invention substantially, or the part contributing to the prior art, or a part of the technical solutions may be implemented in the form of a software product, the computer software product is stored in a storage medium, and includes multiple instructions enabling a computer device (may be a personnel computer, a server, or a network device, etc.) to execute all or a part of the steps of the methods in the embodiments of the present invention. The foregoing storage medium includes a variety of media capable of storing program codes, such as a USB disk, a mobile hard disk, a read-only memory (ROM), a random access memory (RAM), a magnetic disk, an optical disk or the like.

The foregoing descriptions are merely specific embodiments of the present invention, rather than limiting the protection scope of the present invention. Those skilled in the art could readily think of variations or substitutions within the disclosed technical scope of the present invention, and these variations or substitutions shall fall within the protection scope of the present invention. Accordingly, the protection scope of the claims should prevail over the protection scope of the present invention.

What is claimed is:

1. A base station, comprising:
a receiver, configured to receive uplink split information sent by a first base station, wherein the uplink split information is used for instructing the first base station to receive data in buffers corresponding to $N_1$ logic channel groups of a user equipment (UE), the $N_1$ logic channel groups are determined by the first base station from a buffer status report (BSR) sent by the UE, and $N_1$ is a positive integer larger than 0;
a processor, configured to determine $N_2$ logic channel groups from the $N_1$ logic channel groups, wherein $N_2$ is a non-negative integer smaller than or equal to $N_1$; and
a transmitter, configured to send feedback information to the first base station, wherein the feedback information is used for indicating the determined result, and the determined result is used for indicating whether the base station receives the data in the buffers corresponding to the $N_2$ logic channel groups.

2. The base station of claim 1, wherein the processor is specifically configured to determine the $N_2$ logic channel groups from the $N_1$ logic channel groups according to at least one of followings:
the uplink split information, a load condition of the second base station and a channel quality between the second base station and the UE.

3. The base station of claim 1, wherein the transmitter is further configured to send first indication information to the UE, wherein the first indication information is used for indicating the second base station will receive the data in the buffers corresponding to the $N_2$ logic channel groups.

4. The base station of claim 3, wherein the receiver is further configured to receive second indication information sent by the first base station, and the second indication information comprises identifiers of $N_3$ logic channel groups of the UE, which are about to transmit data, $N_3$ is a positive integer larger than or equal to $N_1$, and
the first indication information is further used for indicating the first base station will receive data in buffers corresponding to rest logic channel groups, wherein the rest logic channel groups are the rest of the logic channel groups when the $N_2$ logic channel groups are excluded from the $N_3$ logic channel groups.

5. The base station of claim 1, wherein the determined result is used for indicating the second base station will receive the data in the buffers corresponding to the $N_2$ logic channel groups, and
the transmitter is further configured to send uplink scheduling information to the UE, wherein the uplink scheduling information is used for instructing the UE to send the data in the buffers corresponding to the $N_2$ logic channel groups to the second base station.

6. The base station of claim 1, wherein $N_2$ equals to 0, and the determined result is used for indicating the second base station will not receive the data in the buffers corresponding to the $N_1$ logic channel groups.

7. The base station of claim 1, wherein the uplink split information comprises the identifier of the UE and a data status of the data in the buffers corresponding to the $N_1$ logic channel groups.

8. A base station, comprising:
a receiver, configured to receive a buffer status report (BSR) sent by a user equipment (UE), wherein the BSR is used for instructing the base station to receive data in buffers corresponding to $N_3$ logic channel groups of the UE, which are about to transmit data, and $N_3$ is a positive integer larger than 0;
a processor, configured to determine $N_1$ logic channel groups from the $N_3$ logic channel groups; and
a transmitter, configured to send uplink split information to a second base station, wherein the uplink split information is used for instructing the second base station to receive data in buffers corresponding to the $N_1$ logic channel groups, so as to enable the second base station to determine $N_2$ logic channel groups from the $N_1$ logic channel groups, and $N_2$ is a non-negative integer smaller than or equal to $N_1$, wherein
the receiver is further configured to receive feedback information sent by the second base station, and the feedback information is used for indicating a result determined by the second base station, and the determined result is used for indicating whether the base station receives the data in the buffers corresponding to the $N_2$ logic channel groups.

9. The base station of claim 8, wherein the processor is specifically configured to determine the $N_1$ logic channel groups from the $N_3$ logic channel groups according to at least one of following:
a load condition of the first base station, a load condition of the second base station and a service type of each logic channel group in the $N_3$ logic channel groups.

10. The base station of claim 8, wherein the transmitter is further configured to send indication information to the UE, and the indication information is used for indicating the second base station will receive data in buffers corresponding to the $N_2$ logic channel groups.

11. The base station of claim 10, wherein the indication information is further used for indicating the first base station will receive data in buffers corresponding to rest logic channel groups, and the rest logic channel groups are the rest of the logic channel groups when the $N_2$ logic channel groups are excluded from the $N_3$ logic channel groups.

12. The base station of claim 8, wherein the transmitter is further configured to send uplink scheduling information to the UE, the uplink scheduling information is used for instructing the UE to send data in buffers corresponding to rest logic channel groups to the first base station, and the rest logic channel groups are the rest of the logic channel groups when the $N_2$ logic channel groups are excluded from the $N_3$ logic channel groups.

13. The method of claim 8, wherein the result determined by the second base station is used for indicating the second base station will receive data in buffers corresponding to the $N_2$ logic channel groups.

14. The base station of claim 8 wherein $N_2$ equals to 0, and the determined result is used for indicating the second base station will not receive the data in the buffers corresponding to the $N_1$ logic channel groups.

15. The base station of claim 8, wherein the uplink split information comprises the identifier of the UE and a data status of the data in the buffers corresponding to the $N_1$ logic channel groups.

16. A user equipment (UE), comprising:
a transmitter, configured to send a buffer status report (BSR) to a first base station, wherein the BSR is used for instructing the first base station to receive data in buffers corresponding to $N_3$ logic channel groups of the UE, which are about to transmit data, and $N_3$ is a positive integer larger than 0; and
a receiver, configured to receive first indication information sent by the first base station or a second base station, wherein the first indication information is used for indicating the second base station will receive data in buffers corresponding to $N_2$ logic channel groups in the $N_3$ logic channel groups, and $N_2$ is a non-negative integer smaller than or equal to $N_3$, and the $N_2$ logic channel groups are determined by the second base station from $N_1$ logic channel groups, and the $N_1$ logic channel groups are determined by the first base station from the $N_3$ logic channel groups, and $N_1$ is a positive integer larger than 0.

17. The UE of claim 16, wherein the receiver is further configured to receive second indication information sent by the first base station or the second base station, the second indication information is used for indicating the UE that the first base station will receive data in buffers corresponding to rest logic channel groups, and the rest logic channel groups are the rest of the logic channel groups when the $N_2$ logic channel groups are excluded from the $N_3$ logic channel groups.

18. The UE of claim 16, wherein the receiver is further configured to receive uplink scheduling information sent by the first base station, the uplink scheduling information sent by the first base station is used for instructing the UE to send data in buffers corresponding to rest logic channel groups to the first base station, and the rest logic channel groups are the rest of the logic channel groups when the $N_2$ logic channel groups are excluded from the $N_3$ logic channel groups; and to receive uplink scheduling information sent by the second base station, wherein the uplink scheduling information sent by the second base station is used for instructing the UE to send the data in the buffers corresponding to the $N_2$ logic channel groups to the second base station.

* * * * *